United States Patent
Gaydos et al.

(10) Patent No.: US 9,909,311 B2
(45) Date of Patent: Mar. 6, 2018

(54) CEILING SYSTEM

(71) Applicant: ARMSTRONG WORLD INDUSTRIES, INC., Lancaster, PA (US)

(72) Inventors: Christopher D. Gaydos, Lititz, PA (US); Brian L. Springer, Lancaster, PA (US); Lori Jo L. Shearer, Millersville, PA (US); Scott L. Huntzinger, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 15/420,440

(22) Filed: Jan. 31, 2017

(65) Prior Publication Data

US 2017/0342710 A1 Nov. 30, 2017

Related U.S. Application Data

(63) Continuation of application No. 15/163,042, filed on May 24, 2016, now Pat. No. 9,556,613.

(51) Int. Cl.
*E04B 9/04* (2006.01)
*B32B 3/06* (2006.01)
(Continued)

(52) U.S. Cl.
CPC .............. *E04B 9/0435* (2013.01); *B32B 3/06* (2013.01); *B32B 5/022* (2013.01); *B32B 7/045* (2013.01);
(Continued)

(58) Field of Classification Search
CPC .......... E04B 9/0435; E04B 9/28; E04B 9/245; E04B 9/001; E04B 9/10; E04B 9/067;
(Continued)

(56) References Cited

U.S. PATENT DOCUMENTS

| 2,066,255 A | 12/1936 | Dempsey |
| 3,032,833 A | 5/1962 | Stanley |

(Continued)

FOREIGN PATENT DOCUMENTS

| EP | 1489241 | 12/2004 |
| FR | 2214800 | 8/1974 |

(Continued)

*Primary Examiner* — Rodney Mintz
(74) *Attorney, Agent, or Firm* — Craig M. Sterner (57) ABSTRACT

A ceiling system includes a grid support member, and first and second ceiling panels abutted at a joint. In the factory-supplied condition, each panel has a facing sheet already adhesively bonded to a central region of the panel. Perimeter portions of the facing are left un-bonded to an annular peripheral region of the surface surrounding the central region. This allows seams to be made in the field. The facing sheet comprises a cantilevered flap extending beyond a peripheral edge of the panel. During field installation, the flap of a first panel extends across the joint overlapping the second panel's un-bonded facing sheet in the peripheral region. The double thickness of facings is cut to form a seam laterally offset from the joint, which is concealed. A field applied or activated adhesive bonds the facing to the peripheral regions of each panel. A related installation method is disclosed.

16 Claims, 12 Drawing Sheets

(51) Int. Cl.
   *B32B 7/12* (2006.01)
   *B32B 7/04* (2006.01)
   *B32B 5/02* (2006.01)
   *E04B 9/24* (2006.01)
   *E04B 9/06* (2006.01)

(52) U.S. Cl.
   CPC ............... *B32B 7/12* (2013.01); *E04B 9/045* (2013.01); *B32B 2250/02* (2013.01); *B32B 2262/101* (2013.01); *B32B 2307/102* (2013.01); *B32B 2419/00* (2013.01); *E04B 9/067* (2013.01); *E04B 9/245* (2013.01)

(58) Field of Classification Search
   CPC .. E04B 1/948; B32B 7/12; B32B 3/02; B32B 2419/00; E04C 2/38; E04F 13/0896
   See application file for complete search history.

(56) References Cited

U.S. PATENT DOCUMENTS

| | | | |
|---|---|---|---|
| 3,149,693 A | 9/1964 | Keller et al. | |
| 3,380,206 A | 4/1968 | Barnett | |
| 3,513,613 A | 5/1970 | Jones et al. | |
| 3,708,935 A | 1/1973 | Kossuth | |
| 3,919,443 A | 11/1975 | Porter | |
| 3,969,865 A | 7/1976 | Andersen | |
| 4,026,081 A | 5/1977 | Delaney et al. | |
| 4,155,206 A | 5/1979 | Player | |
| 4,241,555 A | 12/1980 | Dickins et al. | |
| 4,284,447 A | 8/1981 | Dickins et al. | |
| 4,586,308 A | 5/1986 | Jennings | |
| 4,640,064 A | 2/1987 | Goodworth, II | |
| 4,991,370 A | 2/1991 | Gailey et al. | |
| 5,001,879 A | 3/1991 | Paliwoda | |
| 5,085,022 A | 2/1992 | Paliwoda | |
| 5,182,893 A | 2/1993 | Goodworth | |
| 5,236,757 A | 8/1993 | Probst et al. | |
| 5,313,759 A | 5/1994 | Chase, III | |
| 5,349,796 A | 9/1994 | Meyerson | |
| 5,401,133 A | 3/1995 | Kuchler | |
| 5,507,125 A | 4/1996 | McClure | |
| 5,609,007 A | 3/1997 | Eichner | |
| 6,145,264 A | 11/2000 | Dallaire | |
| 6,305,137 B1 | 10/2001 | Rebman | |
| 6,467,228 B1 | 10/2002 | Wendt et al. | |
| 6,610,160 B2 * | 8/2003 | Harrison | B29C 63/02 156/213 |
| 7,765,762 B2 | 8/2010 | Gulbrandsen et al. | |
| 7,937,903 B2 | 5/2011 | McGee et al. | |
| 8,684,134 B2 | 4/2014 | Dugan et al. | |
| 9,279,253 B1 * | 3/2016 | Gaydos | E04B 9/34 |
| 9,290,931 B2 | 3/2016 | Grace | |
| 9,347,220 B1 | 5/2016 | Gaydos et al. | |
| 9,556,613 B1 * | 1/2017 | Gaydos | E04B 9/0435 |
| 9,739,057 B2 * | 8/2017 | Bergman | E04B 9/28 |
| 2002/0014051 A1 | 2/2002 | Fraval et al. | |
| 2002/0096243 A1 * | 7/2002 | Harrison | B29C 63/02 156/94 |
| 2003/0145547 A1 | 8/2003 | Kliegle et al. | |
| 2003/0154686 A1 | 8/2003 | Platt | |
| 2004/0055239 A1 | 3/2004 | Hang | |
| 2005/0217194 A1 | 10/2005 | Krantz-Lilienthal et al. | |
| 2006/0096213 A1 | 5/2006 | Griffin et al. | |
| 2007/0044407 A1 | 3/2007 | Elliott | |
| 2007/0125042 A1 | 6/2007 | Hughes et al. | |
| 2007/0193131 A1 | 8/2007 | Ortiz | |
| 2008/0155927 A1 | 7/2008 | Wendt et al. | |
| 2009/0004459 A1 | 1/2009 | Kipp et al. | |
| 2009/0173030 A1 | 7/2009 | Gulbrandsen et al. | |
| 2009/0239059 A1 | 9/2009 | Kipp et al. | |
| 2009/0239429 A1 | 9/2009 | Kipp et al. | |
| 2010/0139189 A1 | 6/2010 | Lalonde | |
| 2011/0179740 A1 | 7/2011 | Padmanabhan | |
| 2012/0137615 A1 | 6/2012 | Wendt | |
| 2014/0000979 A1 * | 1/2014 | Dugan | E04B 1/8409 181/290 |
| 2015/0330074 A1 * | 11/2015 | Bergman | E04B 9/366 52/144 |
| 2016/0002916 A1 | 1/2016 | Grace | |
| 2016/0138265 A1 * | 5/2016 | Gaydos | E04B 9/045 52/506.07 |
| 2016/0273217 A1 * | 9/2016 | Huntzinger | E04B 9/0435 |
| 2016/0273218 A1 * | 9/2016 | Gaydos | E04B 9/28 |
| 2017/0067252 A1 * | 3/2017 | Duschl | E04B 9/0435 |

FOREIGN PATENT DOCUMENTS

| | | |
|---|---|---|
| GB | 2152091 | 7/1985 |
| NL | 1034759 | 5/2009 |
| WO | 2005/59267 | 6/2005 |

\* cited by examiner

CEILING SYSTEM

CROSS-REFERENCE TO RELATED APPLICATION

The present application is a continuation of U.S. patent application Ser. No. 15/163,042, filed on May 24, 2016 and issued as U.S. Pat. No. 9,556,613, the entirety of which is hereby incorporated by reference.

FIELD

The present invention relates to suspended ceiling systems with concealed support grids.

BACKGROUND

Numerous types of suspended ceiling systems and methods for mounting ceiling panels have been used. One type of system includes a suspended support grid including an array of intersecting grid support members configured to hang a plurality of individual ceiling panels therefrom. It is desirable in some cases to conceal the support grid for providing the appearance of a monolithic ceiling. It is further desirable to apply a facing scrim or sheet to the bottom surface of the ceiling panels for concealing the joints between the ceiling panels.

SUMMARY

A ceiling system is provided which conceals the ceiling support grid and ceiling panel joints. The joints may be concealed with overlapping field cut facings or scrims forming seams between adjoining facings which are laterally offset from the joint. A double-cut seam may be made in the field creating tight seams between the facings with no appreciable gaps.

To achieve the foregoing seam arrangement, in one embodiment the ceiling panels in their factory-supplied, pre-installed condition may be shipped to the field installation site with a pre-attached facing sheet which is adhesively bonded to only a central region on the bottom surface of the ceiling panel body (i.e. surface which will be visible and facing towards the room below the ceiling system). The perimeter portions of the facing sheet on all sides are not bonded to the annular peripheral region on the bottom surface of the panel body surrounding the central region. In one implementation, the facing sheet extends beyond at least one first peripheral edge of the ceiling panel forming a cantilevered flap. The facing sheet does not extend beyond the opposite peripheral edge of the panel in one embodiment. Each ceiling panel may have this facing arrangement.

During field installation, the facing sheet flap of the first ceiling panel overlays a peripheral edge and perimeter portion of an adjoining second ceiling panel This creates a double thickness of unbounded facing sheets which may then be severed along a cut line to form a seam between the mating facing sheets of each panel. Following the seam formation, the unsecured perimeter portions of the two adjoining facing sheets adjacent to the ceiling panel joint may then be adhesively bonded to the peripheral portions of the ceiling panels with a field applied and/or activated adhesive to complete the installation. In some embodiments, an inactivated adhesive may be pre-applied in the factory to the annular peripheral region of the bottom surface of each ceiling panel. The adhesive may be activated in the field via a heat gun, ultraviolet radiation, application of pressure, or other means depending on the type of adhesive used. Advantageously, the present ceiling system does not require complete installation of the facing sheets in the field which are prone to misalignment problems. The factory partially pre-installed facing sheets ensure proper orientation and layout of the facings with respect to each panel while the unsecured perimeter portions allow field cutting and adjustment of seams between facing sheets.

In one embodiment, a ceiling system includes: a longitudinally extending grid support member including a bottom surface; a first and second ceiling panel mounted below the grid support member, each ceiling panel including an acoustic panel body having a top surface, opposing bottom surface defining a horizontal plane, plurality of peripheral edges extending therebetween defining a perimeter, a central region of the bottom surface spaced inwards from the peripheral edges, and an annular peripheral region of the bottom surface surrounding the central region and lying between the central region and the peripheral edges; a longitudinally-extending joint formed between adjoining first peripheral edges of each of the first and second ceiling panels; a first facing sheet adhered to the central region of the first ceiling panel with a factory-applied adhesive layer, and an annular perimeter portion of the first facing sheet being un-adhered to the peripheral region of the first ceiling panel adjacent to the joint; wherein the perimeter portion of the first facing sheet adjacent to the joint extends laterally outwards beyond the first peripheral edge of the first ceiling panel forming a first cantilevered flap, and the perimeter portion of the first facing sheet opposite the joint does not extend beyond a second peripheral edge of the first ceiling panel opposite the first peripheral edge; a second facing sheet adhered to the central region of the second ceiling panel with a factory-applied adhesive layer, and an annular perimeter portion of the second facing sheet being un-adhered to the peripheral region of the second ceiling panel adjacent to the joint; wherein the perimeter portion of the second facing sheet adjacent to the joint does not extend beyond the first peripheral edge of the second ceiling panel, and the perimeter portion of the second facing sheet opposite the joint extends laterally outwards beyond a second peripheral edge of the second ceiling panel opposite the first peripheral edge forming a second cantilevered flap; wherein the first cantilevered flap of the first facing sheet extends across the joint to the second panel such that the cantilevered flap is positioned on the peripheral region of the second ceiling panel.

In one embodiment, a factory-fabricated ceiling panel in a condition before installation includes: a rectilinear acoustical panel body comprising a top surface and a bottom surface; a first panel edge and an opposing second panel extending between the top and bottom surfaces; a third panel edge and an opposing fourth panel extending between the top and bottom surfaces, the first panel edge and the second panel edge each being perpendicular and adjacent to the third and fourth panel edges; a perimeter defined by the first, second, third, and fourth panel edges; the bottom surface of the panel body comprising a central region spaced inwards from the peripheral edges and an annular peripheral region surrounding the central region, the annular peripheral region extending between the central region and the first, second, third, and fourth peripheral edges; a rectilinear facing sheet adhered to the central region of the bottom surface with a factory-applied adhesive layer, wherein an annular perimeter portion of the facing sheet is not adhered to the bottom surface of the acoustical panel body along the annular peripheral region of the bottom surface of the panel body;

wherein the facing sheet along the first panel edge extends outwards beyond the first panel edges forming a cantilevered facing flap; and wherein the facing sheet along the second panel edge does not extend outwards beyond the second panel edge.

A method for installing a ceiling system is disclosed. The method includes: providing first and second ceiling panels to a jobsite, each panel in a factory supplied condition including an acoustic panel body having a top surface, opposing bottom surface, plurality of peripheral edges extending therebetween defining a perimeter, and a facing sheet adhered to a central region of bottom surface with a factory-applied adhesive, the facing sheet being un-adhered to an annular peripheral region of the bottom surface surrounding the central region, wherein the facing sheet includes a cantilevered flap extending beyond a first peripheral edge of the panel body, and the facing sheet includes an un-adhered perimeter portion in the peripheral region which does not extend beyond a second peripheral edge of the panel body opposite the first peripheral edge; positioning the first and second ceiling panels beneath a longitudinally-extending grid support member; abutting the first peripheral edge of the first ceiling panel with the flap of facing sheet against the second peripheral edge of the second ceiling panel without the flap of facing sheet, thereby forming a joint; locating the flap of the first ceiling panel over the peripheral region of the second ceiling panel; overlapping the flap of the first ceiling panel with the un-adhered perimeter portion of the facing sheet of the second ceiling panel in the peripheral region of the second ceiling panel, thereby forming a double thickness of facing sheets; cutting through the double thickness of facing sheets along a line to create an abutment seam, wherein an end segment the flap and an end segment of the un-adhered perimeter portion of the facing sheet of the second ceiling panel in the peripheral region are severed; removing the end segments of the flap and facing sheet, thereby leaving remaining portions of the flap and the un-adhered perimeter portion of the facing sheet of the second ceiling panel in the peripheral region; and adhering the remaining portions of the flap and the un-adhered perimeter portion of the facing sheet of the second ceiling panel to the peripheral region of the second ceiling panel; wherein the joint between the first and second ceiling panels is concealed by the facing sheet of the first ceiling panel.

BRIEF DESCRIPTION OF THE DRAWINGS

The features of the exemplary embodiments of the present invention will be described with reference to the following drawings, where like elements are labeled similarly, and in which.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 1:
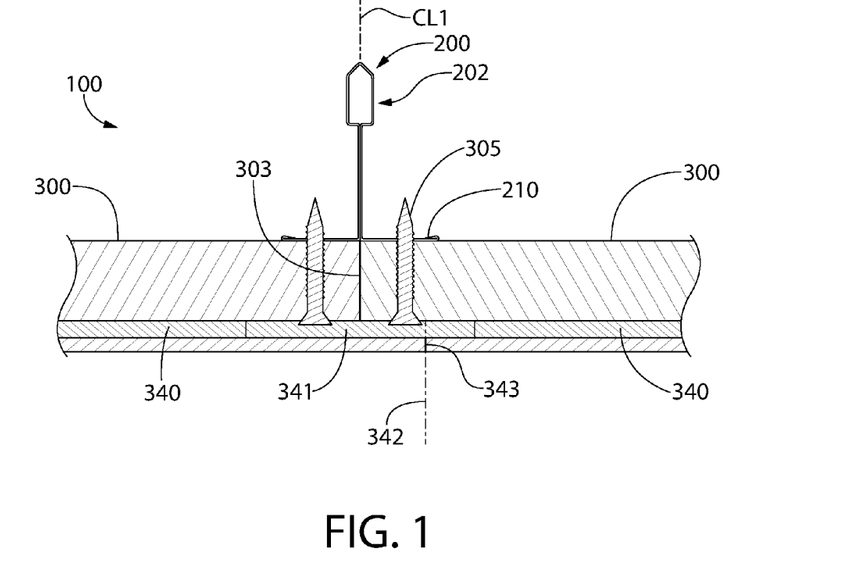
FIG. 1 is a side elevation cross-sectional view of a ceiling system according to the present disclosure comprising a grid support member and ceiling panels with peripheral edges forming a butt joint therebetween.
Figure 17:
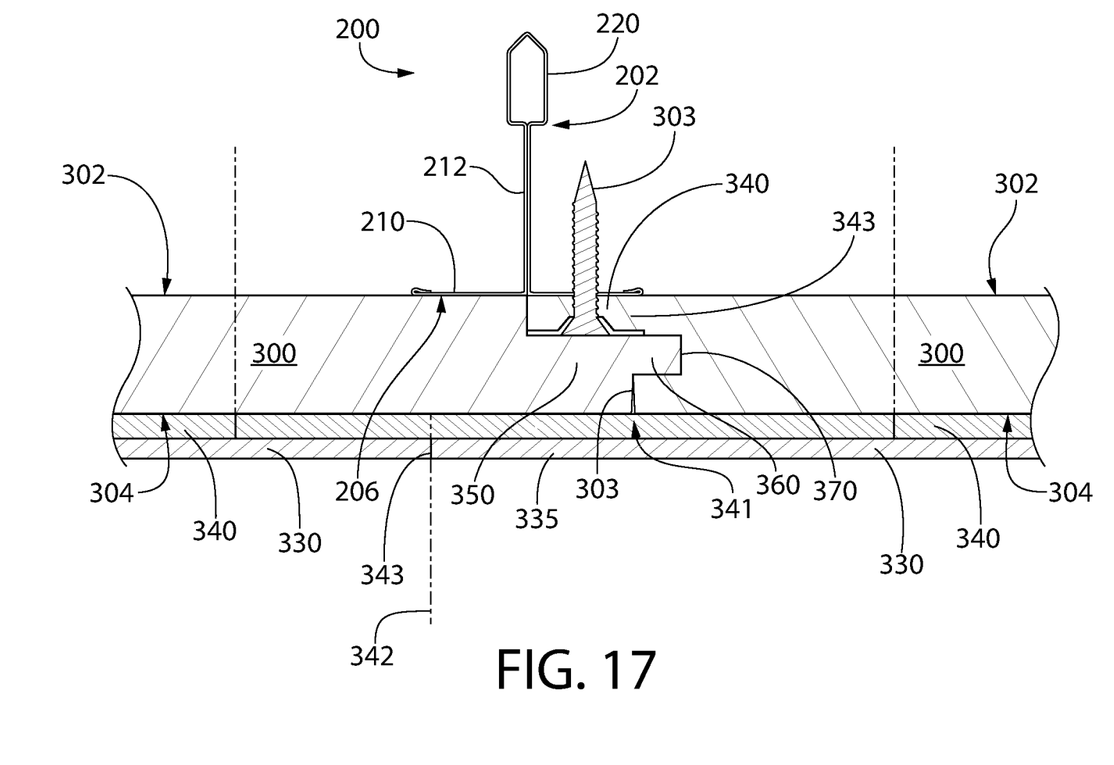
FIG. 17 is a side elevation cross sectional view showing an alternative construction of ceiling panels with peripheral edges having a hybrid edge detail forming an interlocked joint therebetween.

FIG. 1 depicts an exemplary embodiment of a ceiling system 100 according to the present disclosure. The ceiling system 100 includes an overhead support grid 200 including a plurality of overhead longitudinal grid support members 202 and ceiling panels 300 supported by the grid support members. The grid support members 202 are mountable in a suspended manner from an overhead building support structure. The system may include at least two panels 300 having abutted peripheral edges which form a joint 303 therebetween. In one embodiment, the joint may be formed beneath the grid support member 202 as seen in FIG. 1. The panels 300 may be directly mounted to the grid support members 202 in one arrangement by any suitable means, for example without limitation threaded fasteners 305 which are driven through the panel and grid support member as shown. In embodiments as shown in FIG. 17, an interlock fit between the ceiling panels 300 allows a first panel to be secured to the grid support member 202 while the other panel is supported by the peripheral edge of the first panel. Other suitable panel mounting arrangements and methods are possible to hang the panels and form the joint.

Figure 7:
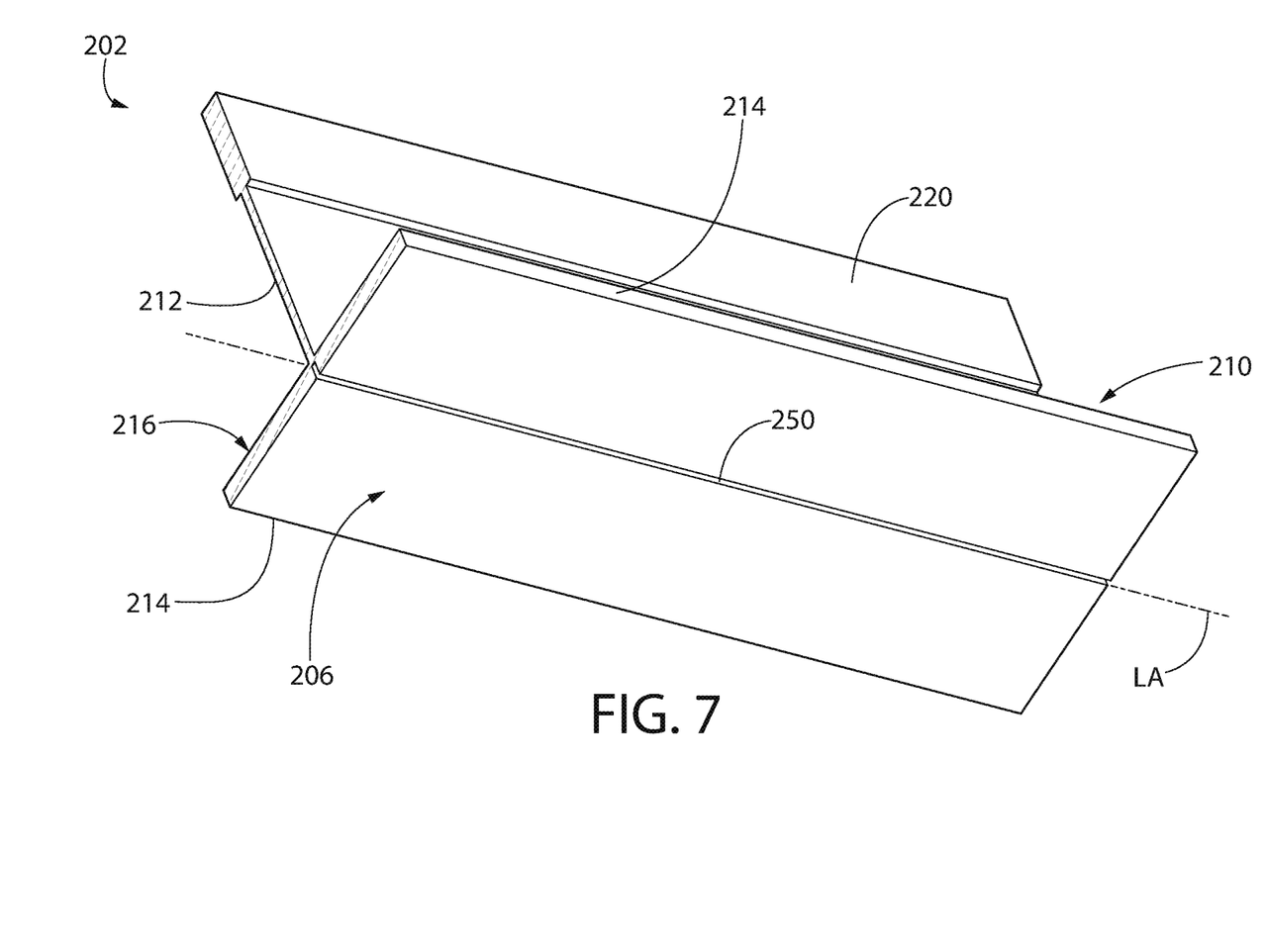
FIG. 7 is a bottom perspective view of the grid support member.

Referring additionally to FIGS. 1 and 7, grid support members 202 are elongated in shape having a length greater than their width (e.g. at least twice), and in various embodiments lengths substantially greater than their widths (e.g. 3 times or more). The grid support members 202 may form "runners" or "rails" and are laterally spaced apart and oriented parallel to each other to position a ceiling panel 300 therebetween. In some embodiments, the longitudinal grid support members 202 may be maintained in a substantially parallel spaced apart relationship to each other by lateral grid support members (not shown) attached between adjacent (but spaced apart) grid support members 202 at appropriate intervals using any suitable permanent or detachable manner of coupling.

In one embodiment, grid support members 202 may be horizontally oriented when installed. It will be appreciated, however, that other suitable mounted orientations of grid support members 202 such as angled or sloped (i.e. between 0 and 90 degrees to horizontal) may be used. Accordingly, although support members 202 may be described in one exemplary orientation herein as horizontal, the invention is not limited to this orientation alone and other orientations may be used.

Grid support members 202 may be T-shaped (e.g. T-rails) in transverse cross section. The grid support members have an inverted T-shaped configuration when in an installed position suspended from an overhead building ceiling support structure. The grid support members 202 may be suspended from the building ceiling support structure via an appropriate hanger mechanism, such as for example without limitation fasteners, hangers, wires, cables, rods, struts, etc.

Grid support members 202 in one non-limiting configuration may each include a longitudinally-extending horizontal bottom flange 210, an enlarged top stiffening channel 220, and a vertical web 212 extending upwards from the flange to the stiffening channel. In some embodiments, the top stiffening channel 220 may be omitted. The grid support members 202 each define a respective longitudinal axis LA and axial directions. Bottom flange 210 has opposing portions which extend laterally outwards from web 212 and terminate in opposed longitudinally extending parallel edges 214. Web 212 may be centered between the edges 214 and vertically aligned with the centerline CL1 of the grid support member in one non-limiting embodiment. In other embodiments, the web 212 may be laterally offset from centerline CL1. Bottom flange 210 further defines a bottom surface 206 facing downwards away from the flange and towards a room or space below the support grid 200. Bottom surface 206 defines a horizontal ceiling reference plane or "grid face" for the overhead support grid 200. Flange 210 further defines a top surface 216 opposite the bottom surface for attaching and supporting the ceiling panel 300 in some embodiments.

Grid support members 202 may be made of any suitable metallic or non-metallic materials structured to support the dead weight or load of ceiling panels 300 without undue deflection. In some non-limiting embodiments, the grid support members may be made of metal including aluminum, titanium, steel, or other. In one embodiment, the grid support members 202 may be a standard heavy duty $15/16$ inch aluminum T-rail. Other shapes of grid support member structures that may be used include solid or hollow square or rectangular structural cross-sections and others.

Referring now FIGS. 1-6, ceiling panel 300 may have a generally flattened rectilinear acoustic panel body 301 with a substantially greater horizontal width and length than vertical thickness as shown. Ceiling panel 300 includes a top surface 302, bottom surface 304, and peripheral edges 306 extending therebetween along four sides of the panel. In various embodiments, the peripheral edges may have various edge profiles including straight edges, angled or sloped edges, stepped tegular edges, shiplap edges, tongue and groove edges, or hybrid edges as shown in FIG. 17 combining a shiplap and tongue and groove features. Other edge profile configurations are possible. Top and bottom surfaces 302, 304 may be generally planar or flat and arranged substantially parallel to each other in one non-limiting embodiment. In other arrangements, the top and bottom surfaces may be angled with respect to each other.

Ceiling panels 300 have acoustic panel bodies 301 may be constructed of any suitable sound-absorbing material including without limitation mineral fiber board, fiberglass, jute fiber, wood, composites, or other. In addition, the ceiling panels 300 may have any suitable dimensions and shapes (in top plan view) including without limitation square or rectangular with unequal length sides.

Figure 3:
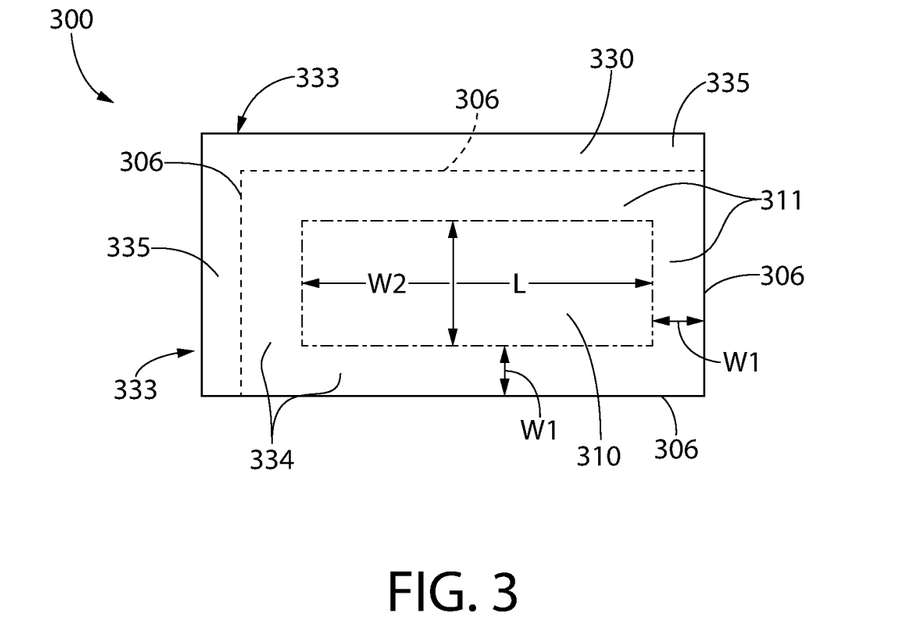
FIG. 3 is a top plan view of the ceiling panel.
Figure 4:
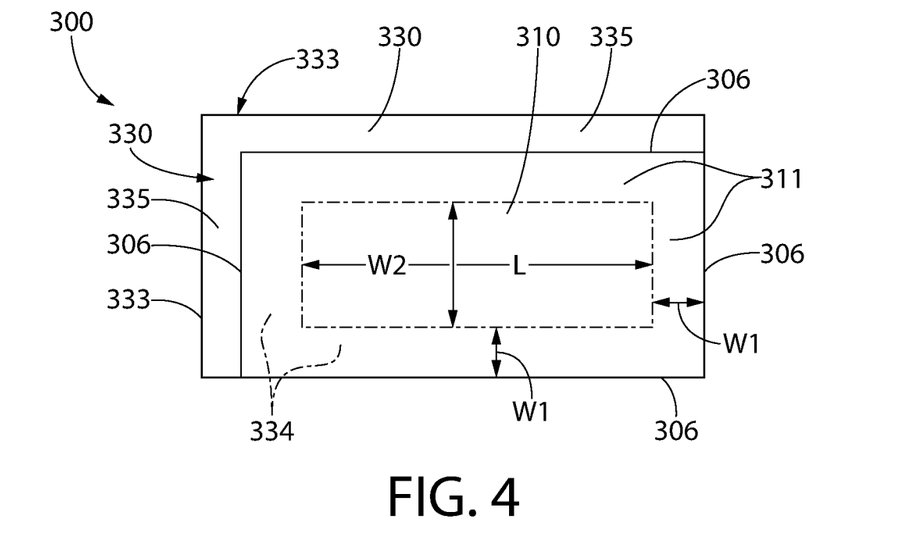
FIG. 4 is a bottom plan view thereof.
Figure 5:
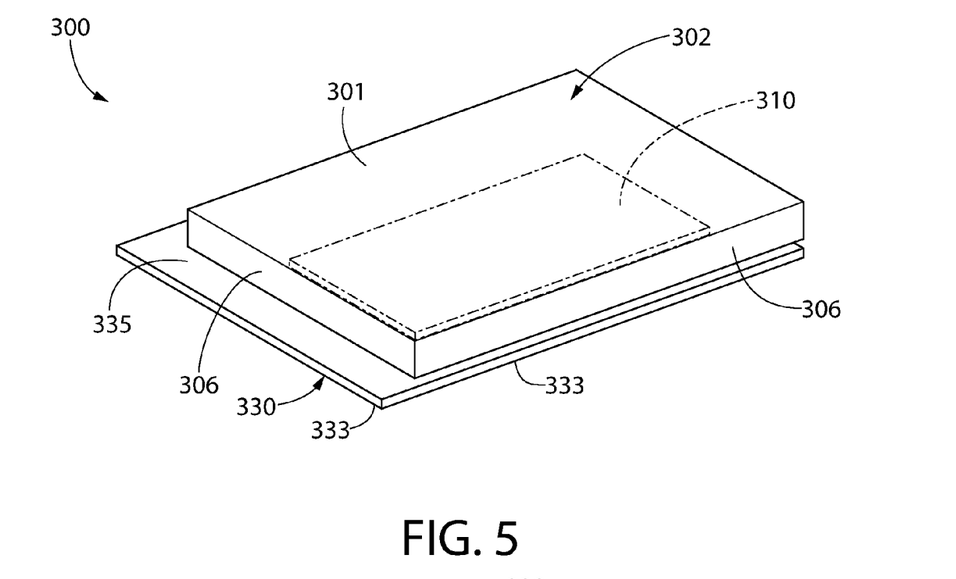
FIG. 5 is a top perspective view thereof.

The bottom surface 304 of the ceiling panel 300 defines a central region 310 and annular peripheral region 311 which surrounds the central region. The peripheral region 311 extends between the central region and each of the peripheral edges 306 of the panel forming a frame around the central region, as best shown in FIGS. 3 and 4. The central region 310 and peripheral region may each have a rectilinear shape in bottom plan view for reasons which will become apparent. In one, peripheral region 311 has a width W1 which is smaller than the width W2 and length L of the central region 310. The width W2 provides a corresponding distance between the peripheral edges 306 of the ceiling panel 300 and the central region 310 for fitting and cutting adjoining facing sheets during the field installation.

Ceiling panel 300 further includes a factory-mounted bottom facing sheet 330 which is attached to the bottom surface 304 of panel body 301 during fabrication of the panel at the factory prior to shipping. This ensures that the facing sheet has the proper orientation and dimensions desired with respect to the panel body 301. In one embodiment, the facing sheet 330 covers at least the entire bottom surface 304 of the ceiling panel 300. Facing sheet 330 has a thin flat structure and may be rectilinear in shape (bottom plan view) including a top surface 331, opposing bottom surface 332, and plurality of perimeter edges 333 extending therebetween around the sheet. The perimeter edges 333 are straight in one embodiment such that each edge is oriented perpendicular to the two adjoining edges which meet at the corners of the sheet. Preferably, the facing sheet is formed of a single monolithic unitary sheet of material rather than being an amalgamation of separate sheets seams together. In other less preferred but suitable embodiments, however, the facing sheet 330 may be formed of two or more sheets of material seamed together.

In one non-limiting embodiment, facing sheet 330 may be adhesively bonded to only the central region 310 of the bottom surface 304 of ceiling panel 300 at the factory with a suitable factory applied thin adhesive film or layer 340. Industrial adhesives which may be used include Swift®tak water-based adhesives from H.B. Fuller Company and others. The annular perimeter portions 334 of the facing sheet 330 (which correspond in position to at least the underlying annular peripheral portion 311 of the panel bottom surface 304) are not adhesively bonded to the peripheral portion to allow for field fitting, cutting, and seaming of the facing during installation of the ceiling system 100, as further described herein.

Figure 6:
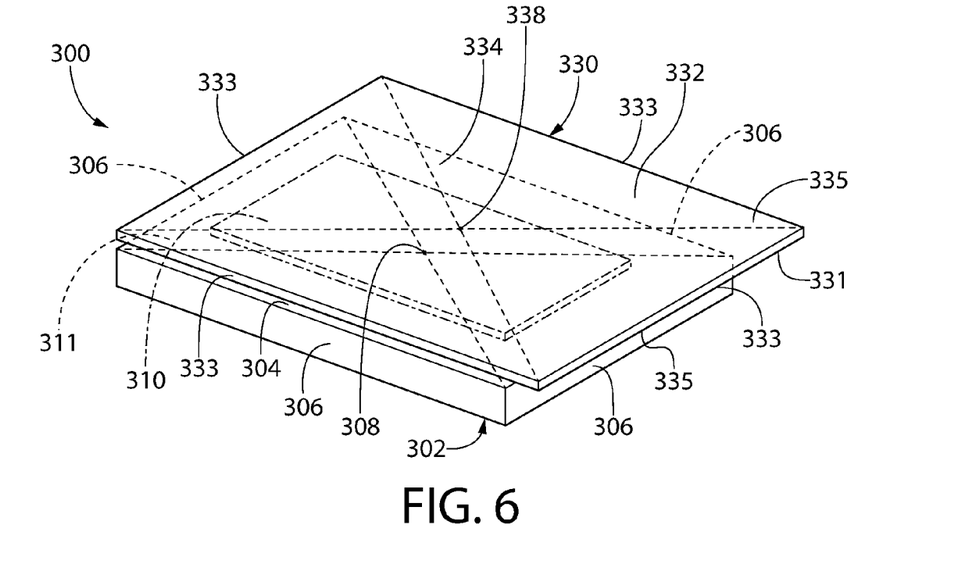
FIG. 6 is a bottom perspective view thereof.

As demonstrated by FIG. 6, the acoustic panel body 301 may have a panel center point 308, which is a point on the bottom surface 304 of the acoustic panel body 301 and equidistant between opposing peripheral edges 306 of the acoustic panel body 301. The facing sheet 330 may have a sheet center point 338, which is a point on the bottom surface 334 of the facing sheet 330 that is equidistant between opposing peripheral edges 333 of the facing sheet 330. The panel center point 308 and the sheet center point 338 may be offset from one another by a distant that is parallel to the bottom surface 304 of the acoustic panel body 301.

In some embodiments, the bottom facing sheet 330 may be in the form of a scrim comprised of laminated non-woven glass fibers in a resin matrix. This type construction is suitable for high end acoustical panels to impart a smooth visual appearance, durability, and dimensional stability. Other suitable scrim materials may be used for the bottom facing sheet 330 and are available from suppliers such as Owens Corning, Lydall, Ahlstrom, and Johns Manville. Such materials may include films, sheets, woven materials and open cell foamed materials.

Figure 2:
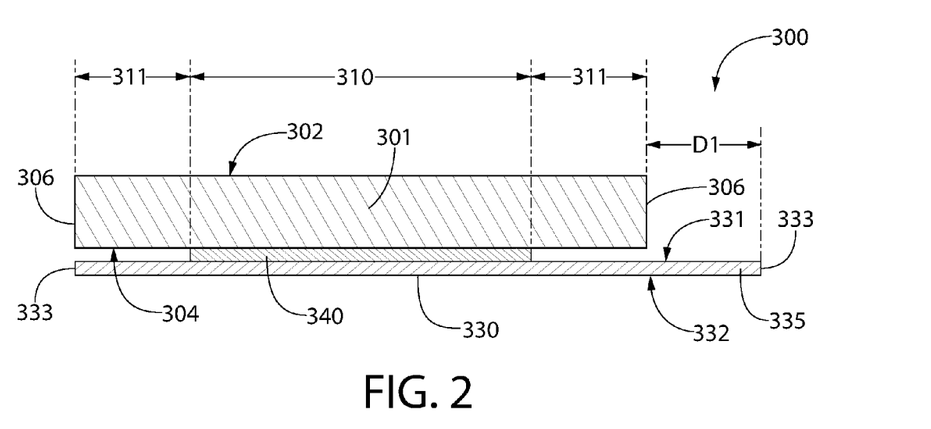
FIG. 2 is a side elevation cross section view of one of the ceiling panels of FIG. 1.

Referring to FIGS. 1-12, the perimeter portion 334 of bottom facing sheet 330 in one embodiment forms at least one cantilevered extension or flap 335 that projects laterally outwards in a horizontal direction beyond at least one peripheral edge 306 of the ceiling panel 300 by a distance D1 (identified in FIG. 2). Accordingly, bottom facing sheet 330 has a larger horizontal length or width in at least one direction measured between opposite perimeter edges 333 than the corresponding length or width of the ceiling panel 300 in that same direction measured between opposite peripheral edges 306. In one embodiment, the flap 335 is continuous and extends in uninterrupted manner along the entire peripheral edge 306 of the ceiling panel from corner to corner as shown. The unsupported flap 335 allows the facing sheet 330 to extend across and over the joint 303 beneath the grid support member 202 to an adjoining ceiling panel 300 and at least partially across the peripheral region 311 of that adjoining panel, thereby concealing the panel joint.

In some embodiments, two laterally extending cantilevered flaps 335 are formed from bottom facing sheet 330 on adjacent peripheral edges 306 of the ceiling panel 300 which meet at a corner, as shown in the illustrated embodiment. Accordingly, a long side and an adjoining short side of the panel each include a facing flap 335. The perimeter portion 334 of the facing sheet on the remaining panel peripheral edges 306 opposite each of the flaps does not extend beyond their respective peripheral edge, and in some embodiments may terminate at a point before the peripheral edge somewhere within the outer peripheral region 311 on the ceiling panel bottom surface 304. The peripheral region 311 forms a cutting zone for cutting and seaming the facing sheets from two adjoining ceiling panels. When the ceiling panels 300 are installed in the ceiling system 100 as shown in FIGS. 13-16 to be further described herein, this arrangement of flaps on two sides alone is sufficient to cover the ceiling panel joints without leaving any portions of the panel bottom surfaces exposed, while minimizing the amount of excess facing which needs to be removed by the installer. However, in other embodiments contemplated, the facing sheet 330 may be configured to form unsupported cantilevered flaps 335 along all peripheral edges 306 of the panels 300.

A method for installing a ceiling system and seaming factory-installed facing during field installation of the system according to the present disclosure will now be described. FIGS. 8-12 illustrate sequential steps in one non-limiting embodiment of the process; however, it will be appreciated that variations are possible. The grid support member 202 from which either one or both of the ceiling panels are supported (depending on the edge profile design of the panels selected) is shown only in FIGS. 8 and 9 for clarity in showing the remaining steps in the facing seaming process.

Figure 8:
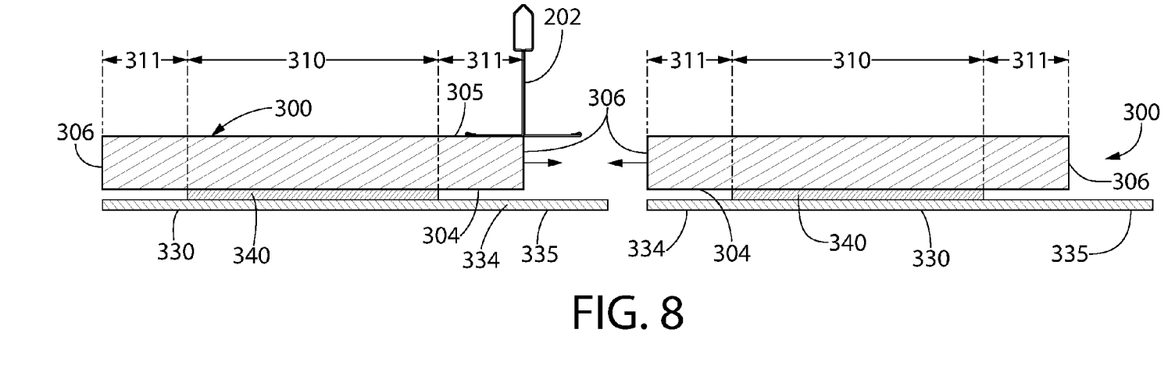
FIGS. 8-12 are side elevation cross-sectional views illustrating sequential steps in a method for installing the ceiling system of FIG. 1 to conceal the joint formed between two ceiling panels.
Figure 9:
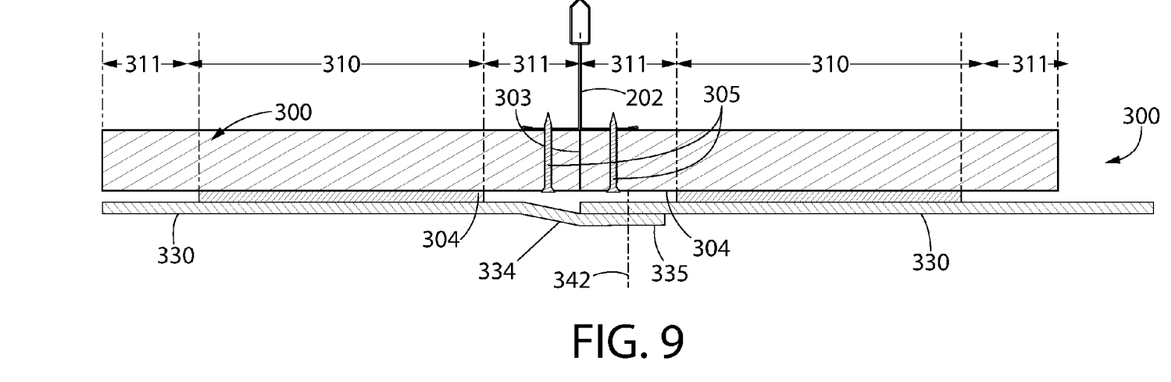

Referring to FIG. 8, first and second ceiling panels 300 to be joined are provided and transported to the field installation site. Each panel includes a facing sheet 333 which is pre-mounted to the bottom surfaces 304 in the factory with the factory-applied adhesive layer 340 as already described herein. The facing sheet is only adhesively bonded to the bottom surface central region 310 of each panel, and not the peripheral regions 311. The panels 300 are positioned beneath grid support member 202, which is mounted to an overhead ceiling support structure of the building. The first ceiling panel 300 may be mounted to the grid support member via fasteners 305 or another suitable mounting mechanism by pulling back the facing sheet to access bottom surface of ceiling panels for installing mounting hardware. The peripheral edges 306 of the panels are then abutted (or interlocked in the embodiment of FIG. 17) by laterally engaging the edge of the second ceiling panel with the first, thereby forming field joint 303 between the panels as shown in FIG. 9. Once positioned, the second ceiling panel 300 may then be mounted to the grid support member 202 and/or first ceiling panel for support.

As seen in FIG. 9, the adjoining ceiling panels 300 are oriented and mounted so that peripheral edge 306 of one first panel has a cantilevered facing flap 335 adjacent the joint (e.g. left panel in this figure) and the other second panel (right panel) has a mating edge that does not have a flap (i.e. facing sheet 330 not extending beyond the peripheral edge of the second panel). The flap 335 extends across and under the joint 303 and overlaps the un-bonded or un-adhered perimeter portion 334 of the facing sheet 330 on the second ceiling panel 300, thereby forming a double thickness of facing material in the peripheral region 311 of the second panel's bottom surface 304.

Figure 10:
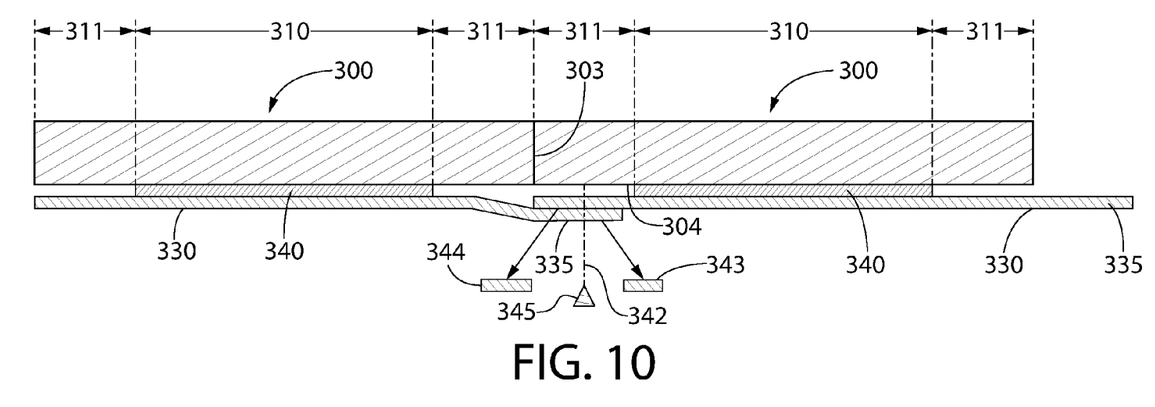
Figure 11:
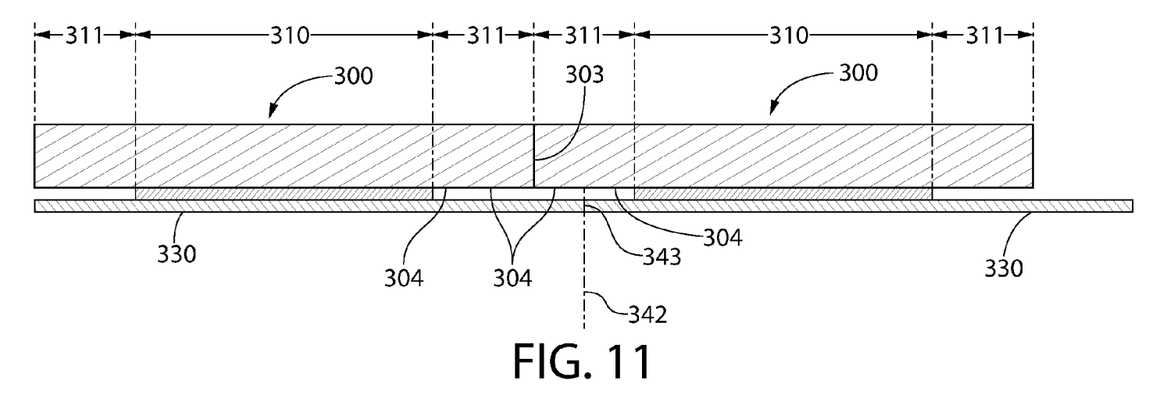

The next step involves establishing a cut line 342 in the double thickness of facings 333 which is laterally offset from the panel joint 303 and lies somewhere within the peripheral region 311 of the second (right) ceiling panel 300. As shown in FIG. 10, a knife blade or other sharp edged cutting tool 345 is run linearly along the cut line 342 (i.e. into the sheet shown in the figure) to cut through the overlapping double facings 330 of the first ceiling panel 300 (i.e. flap 335) and second ceiling panel. The excess severed pieces or end segments 343, 344 of the facing sheets 330 (which would be strips of facing in actuality) are then removed and discarded, thereby leaving an abutment seam 343 between the adjoining facings 330 which is located in the peripheral region 311 of the second ceiling panel (right) as shown in FIG. 11. The ceiling panel joint 303 is concealed beneath the facing sheets; specifically the facing sheet 330 of the first ceiling panel on the right. The seam 343 is laterally offset from the ceiling panel joint.

Figure 12:
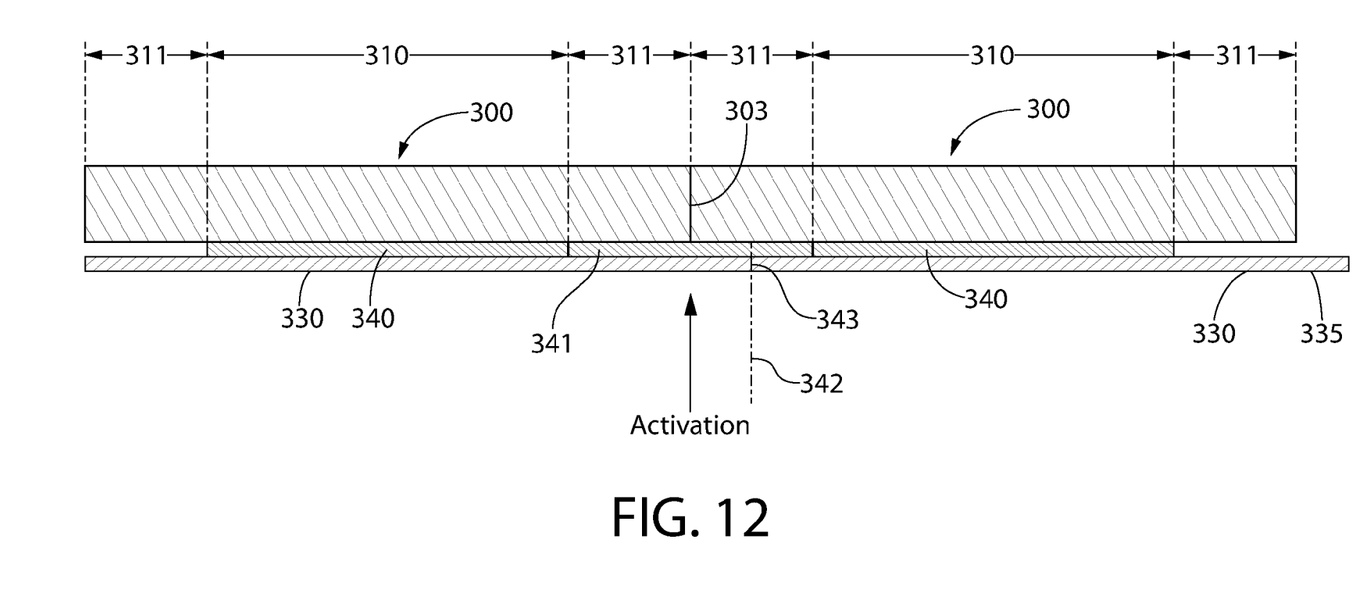
Figure 13:
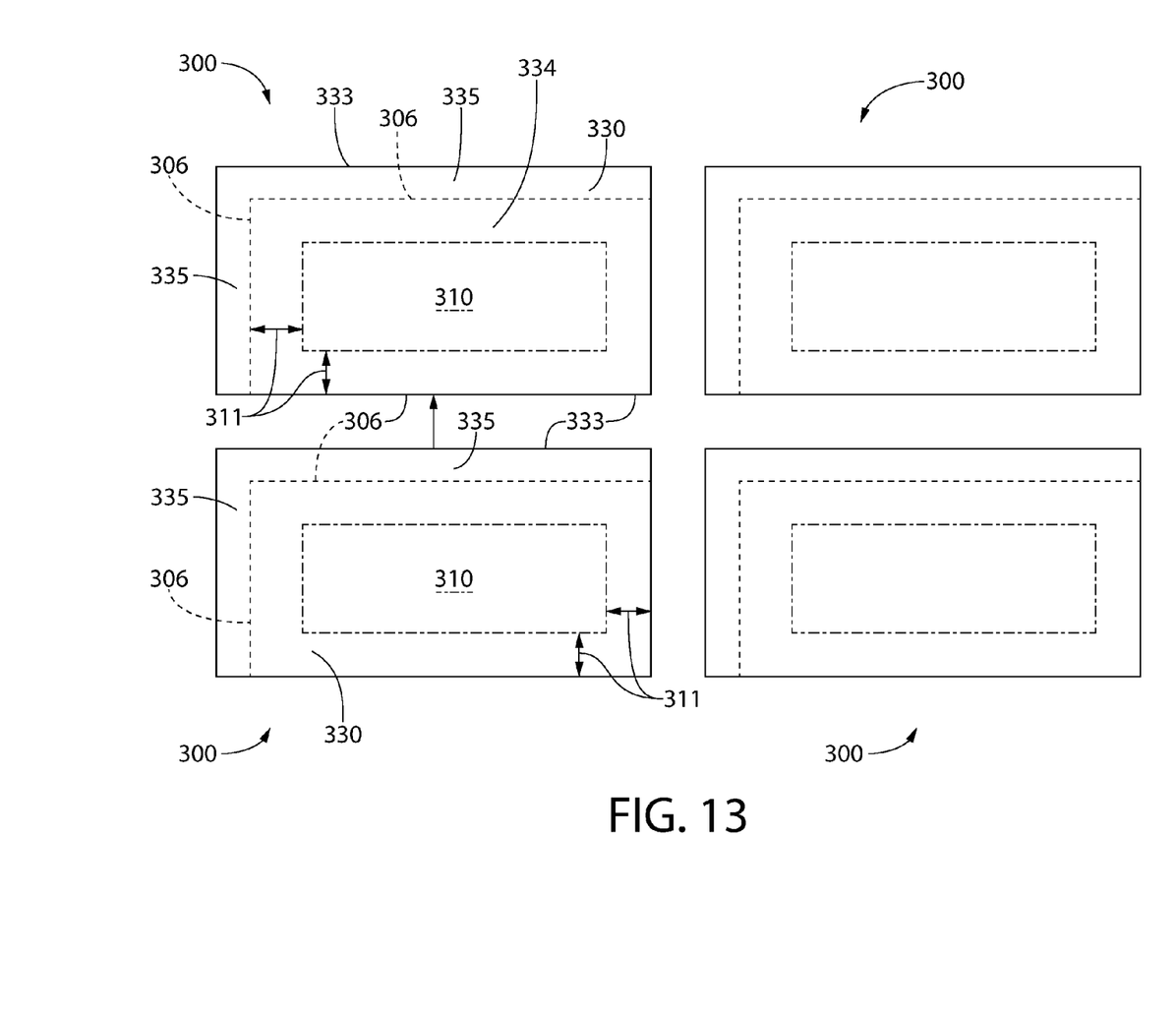
FIGS. 13-16 are bottom plan views illustrating sequential steps in a method for assembling an array of ceiling panels prior to cutting and trimming the facing sheets on the bottom surfaces of the panels.
Figure 14:
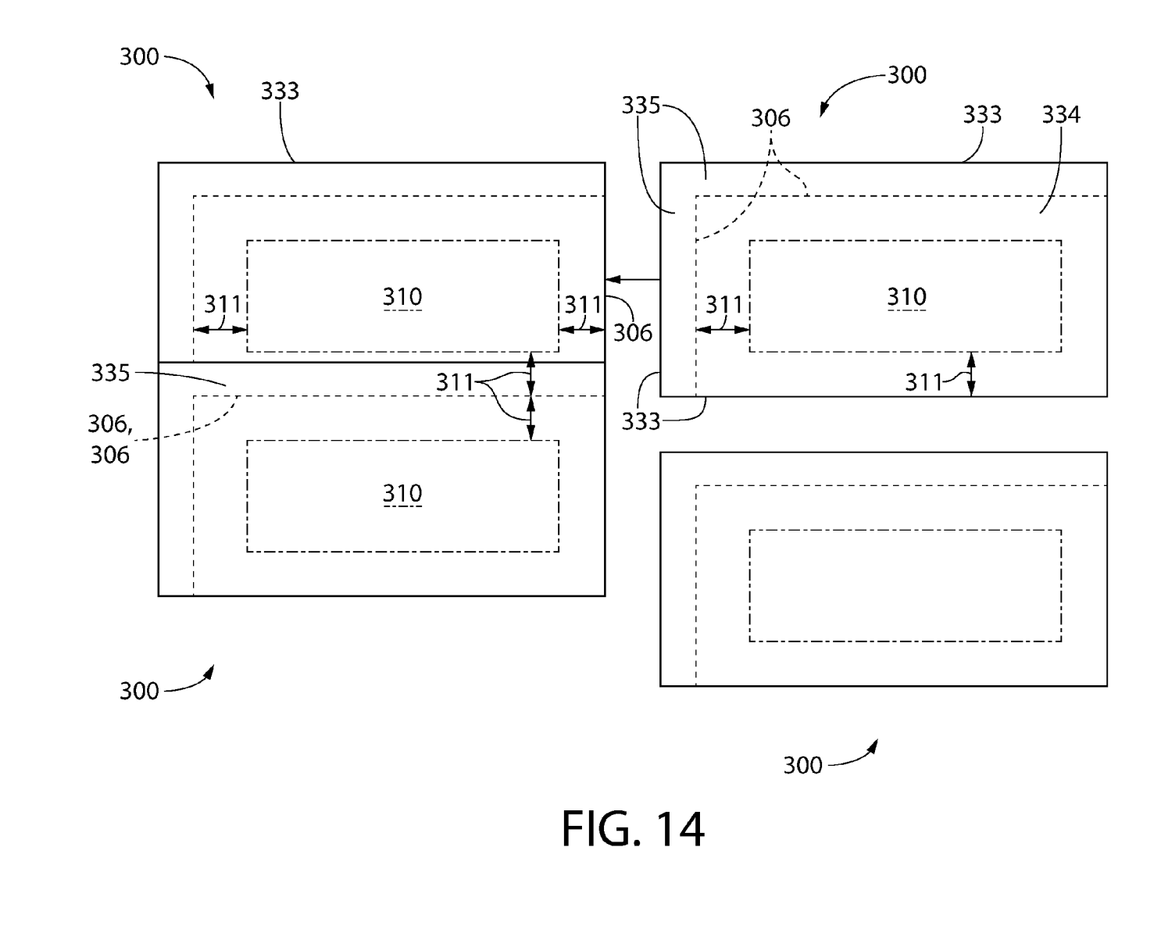
Figure 15:
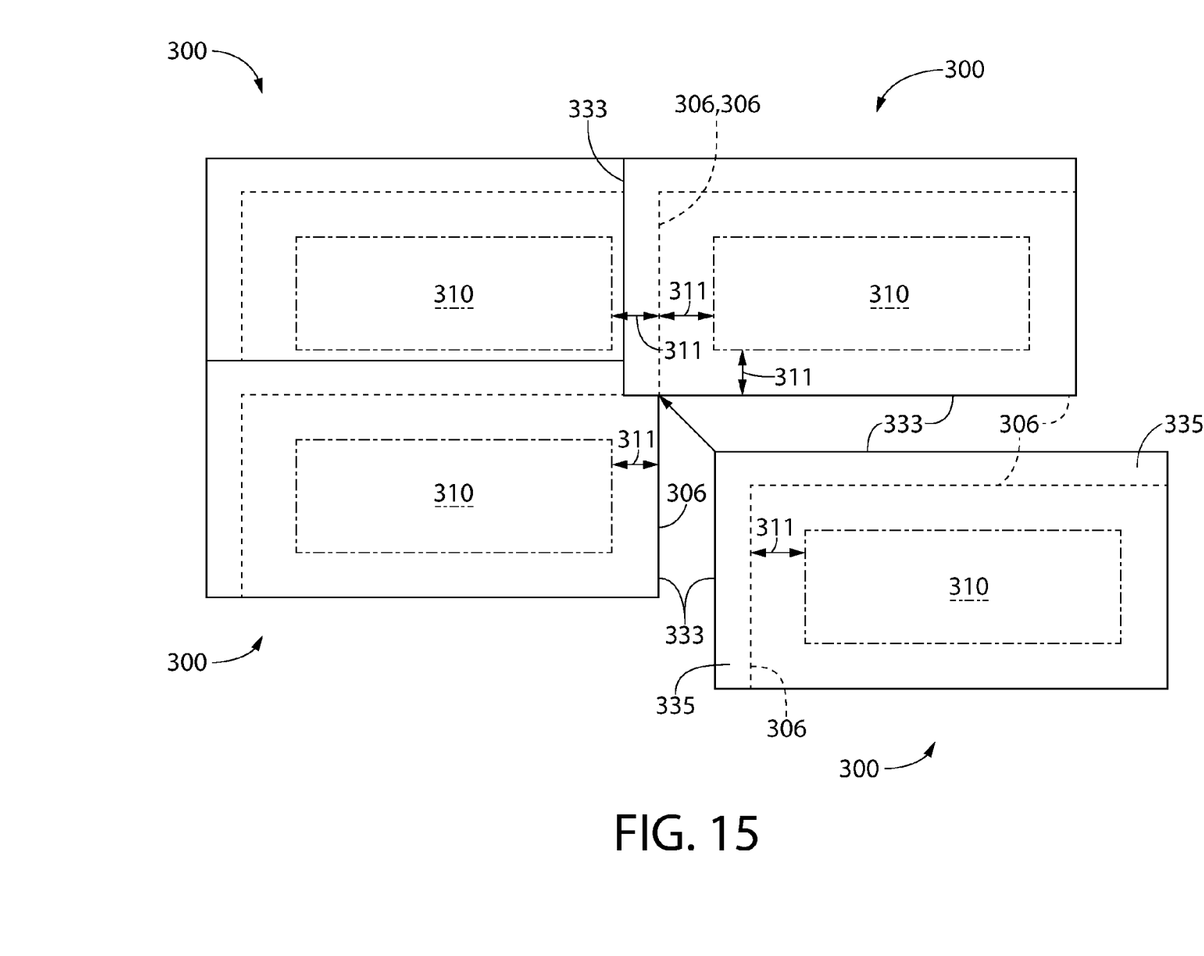
Figure 16:
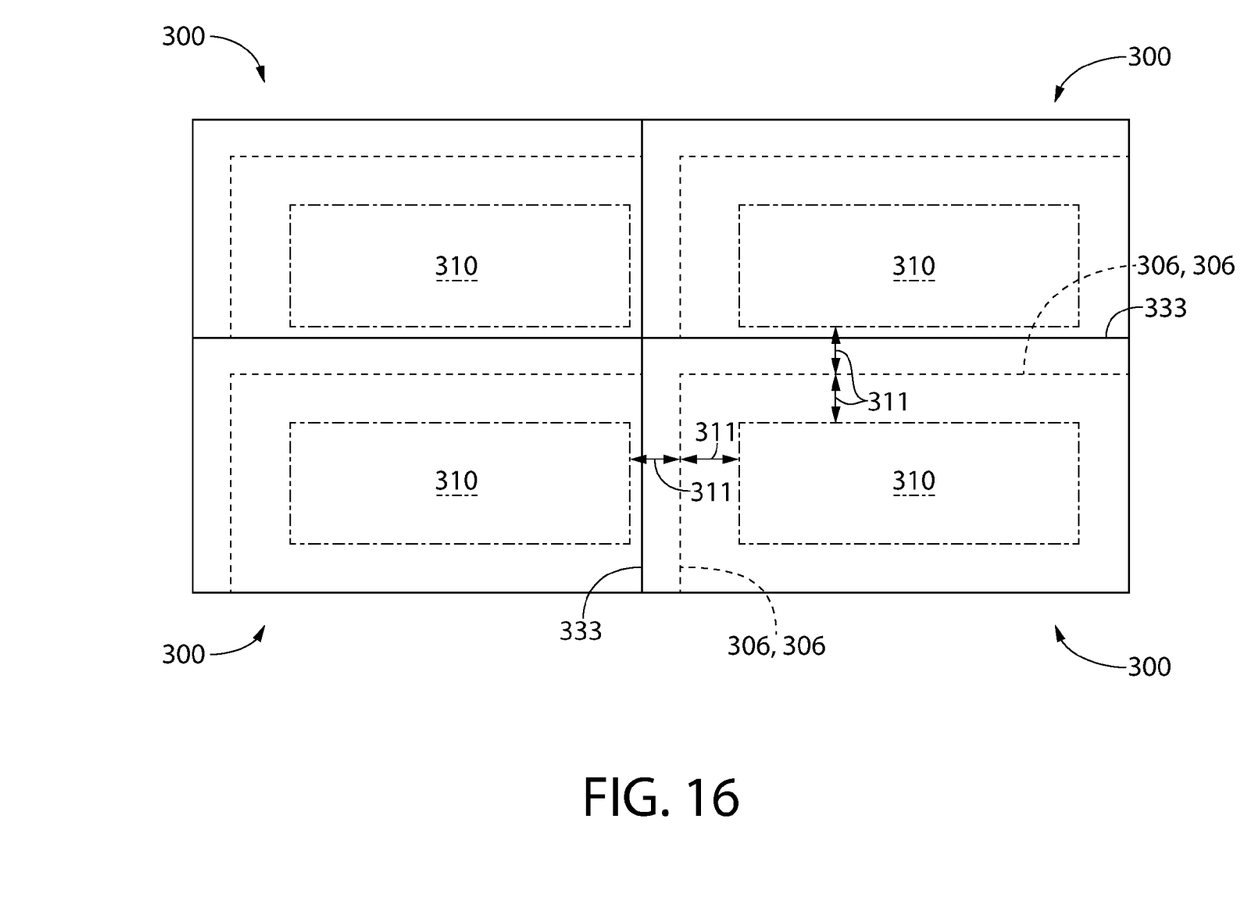

For attaching and bonding the perimeter portions 334 of the facing sheets 330 to bottom surfaces 304 of both the first and second ceiling panels of each panel, a suitable adhesive layer 341 is then applied and/or activated in the field to the peripheral regions 311 of each panel. The facing sheets are contacted with the field adhesive layer to complete the facing bonding and seaming process, as shown in FIG. 12. The field applied or activated adhesive layer 341 covers the portions of the ceiling panels in the joint area between the central regions 310 which were previously already adhered to the panels at the factory. In some embodiments, an inactivated adhesive layer may be pre-applied to the peripheral regions of the ceiling panel bottom surfaces 304 in the factory prior to shipment, which is then activated in the field by the installer for bonding the facing to the panels. Either approach is acceptable.

Numerous types of field applied or activated adhesive layers 341 may be used, such as for examples without limitation heat or ultraviolet activated adhesives, pressure sensitive adhesives, spray adhesives, and hot melt adhesives (e.g. heat activated or applied hot). Yet other field adhesives and bonding methods that may be used also includes double-sided adhesive strips or tape. The field applied or activated adhesive layer 341 may be a permanent type of adhesive, or alternatively a semi-permanent and releasable adhesive to allow the facing sheet to lifted at the seams 343 if necessary for adjustments or access to the ceiling panel and mounting hardware above the facing.

In one embodiment, the type of factory-applied adhesive layer 340 used to bond the facing sheets 330 to the central regions 311 of the ceiling panel bottom surfaces 304 may be different than the type of field adhesive layer 341 used. Certain adhesives are better suited for installation in a factory under precisely controlled fabrication and adhesive curing conditions rather than in the field requiring quickly curing or activated adhesives to enhance ceiling system installation productivity.

It is important to note that the thicknesses of the adhesive layers 340 and 341 have been intentionally exaggerated for illustration purposes only to clearly show the boundaries between the factory applied adhesive in the central region 310 of the ceiling panels 300 and the field applied or activated adhesives in the surrounding annular peripheral regions 311. In actuality, the thickness of the adhesive layers is de minimis such that the facing sheet 330 lies substantially in the same horizontal plane as the bottom surface 206 of the grid support member bottom flange 210. Accordingly, there would be no clearly discernible gaps between the facing sheet and bottom surface of the ceiling panels. The adhesive layers 340 and 341 should therefore not be construed or interpreted as actual physical structures such as spacers or other members sometimes used in ceiling panel construction to accommodate insertion of a portion of the bottom flange into the gap for mounting the panels.

It will be appreciated that numerous variations in the foregoing ceiling panel installation and facing seaming process and sequence are possible.

Additional ceiling panels 300 may be installed in a similar manner, as shown schematically in the bottom plan views of FIGS. 13-16. These figures depict one embodiment of sequential steps for mounting and assembling an array of panels. The ceiling panel peripheral edges 306 are shown in dashed lines beneath the facing sheets 330. It bears noting that the perimeter edges 333 of the cantilevered facing flaps 335 are each positioned in a peripheral region 311 of the adjoining ceiling panel across the panel joint 303 which form facing seams 343 lying in the same regions.

The foregoing facing seaming process may similarly used and followed for interlocking panels as shown in FIG. 17 which include hybrid panel edge profiles which combine including shiplap and tongue and groove feature. One abutting ceiling panel 300 includes an upper shiplap profile or feature 340 adjacent top surface 302 and the mating panel includes a lower shiplap profile or feature 350 offset and spaced vertically apart/downward from the top surface of each panel 300. The panel 300 with the upper shiplap feature 340 (right panel) includes a laterally open groove 370 in the panel peripheral edge which receives a laterally outward projecting cantilevered tongue 360 formed on the mating edge of the panel having the lower shiplap feature 350 as shown. Joint 303 between the panels 300 has a compound rectilinear shape.

The peripheral edges 333 including a lower shiplap feature 350 may further include a male shiplap feature comprising a laterally outward projecting cantilevered tongue 360 configured for insertion into a mating female shiplap feature comprising a laterally open groove 370 formed in an adjoining ceiling panel peripheral edge 333 (see, e.g. FIGS. 8 and 9).

Accordingly, the type of panel edge details used is not limiting of the invention or restrictive.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

The invention claimed is:

1. A factory-fabricated ceiling panel comprising:
a panel body comprising a top surface, a bottom surface, a first panel edge extending between the top and bottom surfaces, and a second panel edge extending between the top and bottom surfaces, the first panel edge being opposite the second panel edge;
a facing sheet coupled to the panel body by a factory-applied adhesive, the facing sheet comprising a first flap having a portion that protrudes beyond the first panel edge and a second flap having a coextensive portion overlying the bottom surface and adjacent the second panel edge that is not adhered to the panel body; and
the first flap terminates in a first sheet edge spaced a first distance from the first panel edge, the second flap terminates in a second sheet edge spaced inward from the second panel edge by a second distance, and the first distance is greater than the second distance.

2. The ceiling panel of claim 1, wherein the first flap further comprises a portion overlying the bottom surface and adjacent the first panel edge that is not adhered to the panel body.

3. The ceiling panel of claim 1, wherein the panel body comprises sound-absorbing material selected from the group consisting of mineral fiber board, fiberglass, jute fiber, wood, and composites.

4. The ceiling panel of claim 1, wherein the facing sheet comprises laminated non-woven glass fibers.

5. The ceiling panel of claim 1, wherein the panel body comprises a third panel edge extending between the top and bottom surfaces, and a fourth panel edge extending between the top and bottom surfaces, the third panel edge being opposite the fourth panel edge, the third and fourth panel edges intersecting the first and second panel edges, wherein the facing sheet comprising a third flap having a portion that protrudes beyond the third panel edge.

6. The ceiling panel of claim 5, wherein the facing sheet comprises a fourth flap having a portion that protrudes beyond the fourth panel edge.

7. A factory-fabricated ceiling panel comprising:
- a panel body comprising a top surface, a bottom surface having a panel center point, and a plurality of panel edges extending between the top and bottom surfaces of the panel body;
- a facing sheet comprising a bottom surface having a sheet center point, a top surface, and a plurality of sheet edges extending between the top and bottom surfaces of the facing sheet;
- a portion of the bottom surface of the panel body that is adjacent to one of the plurality of panel edges is not adhered to the facing sheet; and
- the facing sheet is positioned and coupled to the panel body such that: (1) the panel center point and the sheet center point are offset from one another; and (2) the facing sheet protrudes beyond at least a first one of the panel edges.

8. The ceiling panel of claim 7, wherein the panel center point and the sheet center point are offset from one another by a distance that is parallel to the bottom surface of the panel body.

9. The ceiling panel of claim 7, wherein the panel center point is defined as a point that is equidistant from opposing panel edges on the bottom surface of the panel body, and the sheet center point is defined as a point that is equidistance from opposing sheet edges on the bottom surface of the facing sheet.

10. The ceiling panel of claim 7, wherein the panel body comprises sound-absorbing material selected from the group consisting of mineral fiber board, fiberglass, jute fiber, wood, and composites.

11. The ceiling panel of claim 7, wherein the facing sheet comprises laminated non-woven glass fibers.

12. The ceiling panel of claim 7, wherein the facing sheet is coupled to the panel body so that the facing sheet protrudes beyond the first one of the panel edges and a second one of the panel edges, the first and second ones of the panel edges being adjacent to one another.

13. The ceiling panel of claim 12, wherein the facing sheet is coupled to the panel body so that the facing sheet further protrudes beyond a third one of the panel edges, the first and third ones of the panel edges being opposite one another.

14. A factory-fabricated ceiling panel comprising:
- a panel body comprising a top surface, a bottom surface, a first panel edge extending between the top and bottom surfaces of the panel body, the bottom surface of the panel body having a first surface area;
- a facing sheet coupled to the panel body by a factory-applied adhesive, the facing sheet comprising a top surface, a bottom surface, and a first sheet edge extending between the top and bottom surfaces of the facing sheet, the bottom surface of the facing sheet having a second surface area; and
- the panel body further comprises a second panel edge extending between the top and bottom surfaces of the panel body, the first panel edge being opposite the second panel edge, and the facing sheet comprises a second sheet edge opposite the first sheet edge, the second sheet edge having a coextensive portion overlying the bottom surface of the panel body and adjacent to the second panel edge that is not adhered to the panel body;
- wherein the second surface area is greater than the first surface area, and the first sheet edge protrudes beyond the first panel edge.

15. The ceiling panel of claim 14, wherein the panel body comprises sound-absorbing material selected from the group consisting of mineral fiber board, fiberglass, jute fiber, wood, and composites.

16. The ceiling panel of claim 14, wherein the facing sheet comprises laminated non-woven glass fibers.

\* \* \* \* \*